US012737584B2

(12) United States Patent
Wang et al.

(10) Patent No.: US 12,737,584 B2
(45) Date of Patent: Sep. 15, 2026

(54) MODEL COMPRESSION SERVICE BASED ON RUNTIME PERFORMANCE

(71) Applicant: INTERNATIONAL BUSINESS MACHINES CORPORATION, Armonk, NY (US)

(72) Inventors: Junsong Wang, Beijing (CN); Qing Wang, Beijing (CN); Tao Wang, Beijing (CN); Chao Xue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1251 days.

(21) Appl. No.: 17/643,243

(22) Filed: Dec. 8, 2021

(65) Prior Publication Data

US 2023/0177307 A1 Jun. 8, 2023

(51) Int. Cl.
*G06N 3/04* (2023.01)

(52) U.S. Cl.
CPC .................................... *G06N 3/04* (2013.01)

(58) Field of Classification Search
CPC .............................. G06N 3/04; G06N 3/0495
See application file for complete search history.

(56) References Cited

U.S. PATENT DOCUMENTS

2015/0310335 A1* 10/2015 Fan ........................ G06F 30/20 706/46
2019/0286973 A1 9/2019 Kovvuri
2019/0340499 A1 11/2019 Burger
2021/0081789 A1* 3/2021 Chai ........................ G06N 3/10

(Continued)

FOREIGN PATENT DOCUMENTS

CN 111598237 A * 8/2020 .......... G06F 17/153
CN 111860779 A * 10/2020

(Continued)

OTHER PUBLICATIONS

Liu, Hanxiao, Karen Simonyan, and Yiming Yang. "Darts: Differentiable architecture search." (2018). (Year: 2019).*

(Continued)

*Primary Examiner* — Andrew J Jung
(74) *Attorney, Agent, or Firm* — Anthony Curro

(57) ABSTRACT

A method, computer system and computer program product for model compression service. The method comprises determining an initial deep neural network (DNN) and an associated compression algorithm available in a compression engine, a type of target hardware and a performance requirement of target hardware. The method also comprises emulating a plurality of different compressed models of the initial DNN on target hardware of the type to obtain corresponding runtime performance data, wherein the different compressed models are defined with different configuration data. The method further comprises obtaining a runtime performance estimator of the target hardware by regression with the different configuration data and the corresponding runtime performance data. Lastly, the method comprises applying the runtime performance estimator to the compression algorithm by the compression engine to generate a compressed DNN of the initial DNN complying with the performance requirement of the type of target hardware.

20 Claims, 6 Drawing Sheets

(56) References Cited

U.S. PATENT DOCUMENTS

| | | | | |
|---|---|---|---|---|
| 2023/0141145 | A1* | 5/2023 | Hong | G06N 3/082 706/26 |
| 2023/0177383 | A1* | 6/2023 | Lohia | G06N 20/00 706/12 |
| 2023/0213918 | A1* | 7/2023 | Lavrik | G05B 19/4183 706/16 |
| 2023/0325638 | A1* | 10/2023 | Kim | H03M 9/00 |

FOREIGN PATENT DOCUMENTS

| | | | | |
|---|---|---|---|---|
| CN | 116451586 | A | * | 7/2023 |
| EP | 3543917 | A1 | | 9/2019 |
| WO | 2018217635 | A1 | | 11/2018 |
| WO | WO-2023072389 | A1 | * | 5/2023 |

OTHER PUBLICATIONS

He et al., "AMC: AutoML for Model Compression and Acceleration on Mobile Devices," arXiv:1802.03494v4 [cs.CV] Jan. 16, 2019, https://arxiv.org/pdf/1802.03494.pdf, 17 pages.
Mell et al., "The NIST Definition of Cloud Computing", National Institute of Standards and Technology, Special Publication 800-145, Sep. 2011, 7 pages.
Wang et al., "HAQ: Hardware-Aware Automated Quantization with Mixed Precision," arXiv:1811.08886v3 [cs.CV] Apr. 6, 2019, https://arxiv.org/pdf/1811.08886.pdf, 10 pages.

* cited by examiner

MODEL COMPRESSION SERVICE BASED ON RUNTIME PERFORMANCE

BACKGROUND

The present invention relates to model compression of a deep neural network (DNN), and more specifically, to a method and system for DNN model compression service based on runtime performance.

MCaaS (Model Compression as a Service) may be increasingly employed to provide model compression service to compress models of deep neural networks (DNNs). Model compression may reduce the model size and computation of DNN models to generate compressed/pruned DNNs to be implemented on target hardware.

Conventionally, proxy signals of the compressed model are used to adjust compression algorithms. Proxy signals, such as FLOPs (floating point operations per second) and model size may be directly calculated from configuration data of model structures. Proxy signals may provide a hint of runtime performance. However, there may be a gap between proxy signals and runtime performance metrics on underlying target hardware. Because of differences in underlying target hardware architectures, actual runtime performance can vary among different hardware/platforms.

SUMMARY

In view of the above, it is contemplated that real hardware runtime performance is advantageously leveraged to guide compression engines to conduct model compression of DNNs.

Embodiments of the invention include a method. The method may comprise determining an initial DNN and an associated compression algorithm available in a compression engine, a type of target hardware and a performance requirement of target hardware. The method may also comprise emulating a plurality of different compressed models of the initial DNN on target hardware of the type to obtain corresponding runtime performance data, wherein the different compressed models are defined with different configuration data. The method may further comprise obtaining a runtime performance estimator of the target hardware by regression with the different configuration data and the corresponding runtime performance data. Lastly, the method may comprise applying the runtime performance estimator to the compression algorithm by the compression engine to generate a compressed DNN of the initial DNN complying with the performance requirement of the type of target hardware.

Embodiments of the invention further include a system. The system may include a processor and a memory containing a program that, when executed on the processor, may perform an operation. The operation may comprise determining an initial DNN and an associated compression algorithm available in a compression engine, a type of target hardware and a performance requirement of target hardware. The operations may also comprise emulating a plurality of different compressed models of the initial DNN on target hardware of the type to obtain corresponding runtime performance data, wherein the different compressed models are defined with different configuration data. The operation may further comprise obtaining a runtime performance estimator of the target hardware by regression with the different configuration data and the corresponding runtime performance data. Lastly, the operation may comprise applying the runtime performance estimator to the compression algorithm by the compression engine to generate a compressed DNN of the initial DNN complying with the performance requirement of the type of target hardware.

Embodiments of the invention further include a non-transitory computer program product, including a computer-readable storage medium having computer-readable program code embodied therewith, the computer-readable program code executable by one or more computer processors to perform an operation. The operation may comprise determining an initial DNN and an associated compression algorithm available in a compression engine, a type of target hardware and a performance requirement of target hardware. The operation may also comprise emulating a plurality of different compressed models of the initial DNN on target hardware of the type to obtain corresponding runtime performance data, wherein the different compressed models are defined with different configuration data. The method may further comprise obtaining a runtime performance estimator of the target hardware by regression with the different configuration data and the corresponding runtime performance data. Lastly, the operation may comprise applying the runtime performance estimator to the compression algorithm by the compression engine to generate a compressed DNN of the initial DNN complying with the performance requirement of the type of target hardware.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
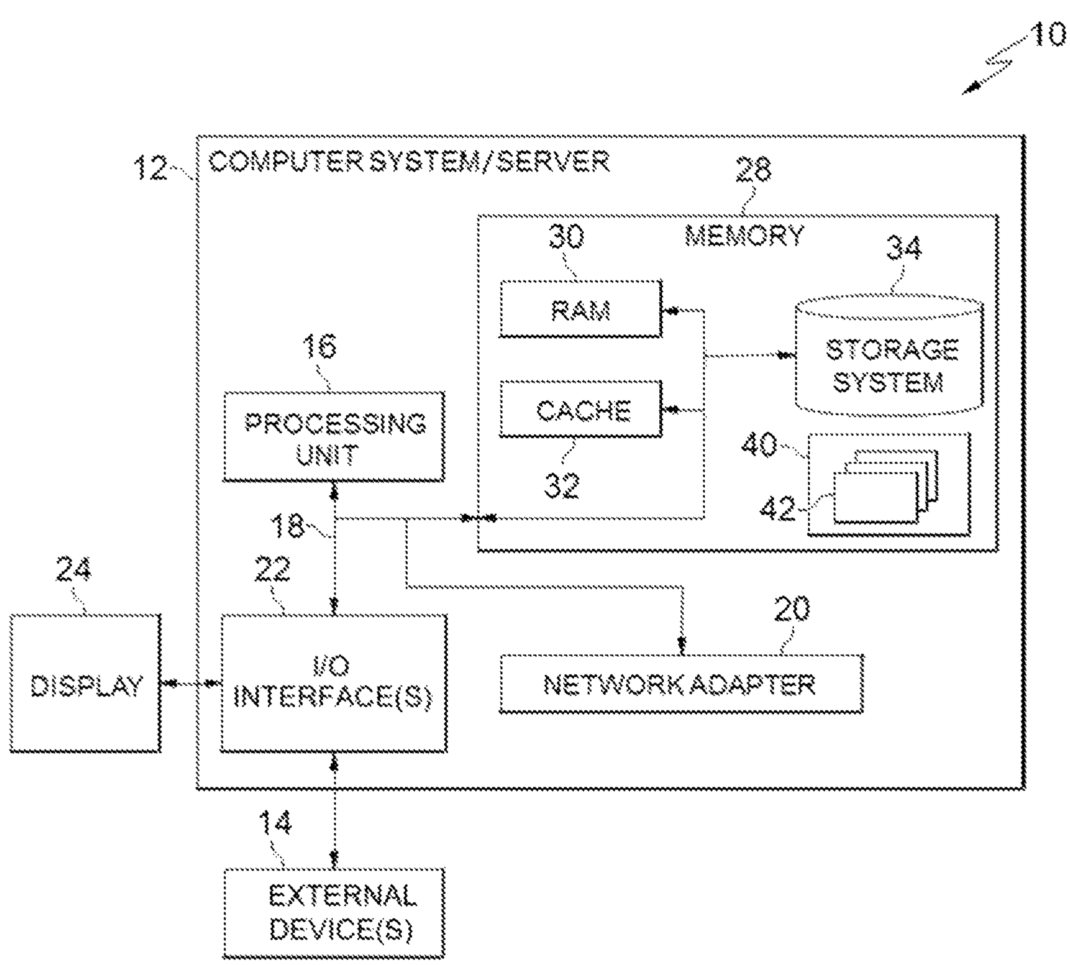
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processing units 16 (also known as "processors"), a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
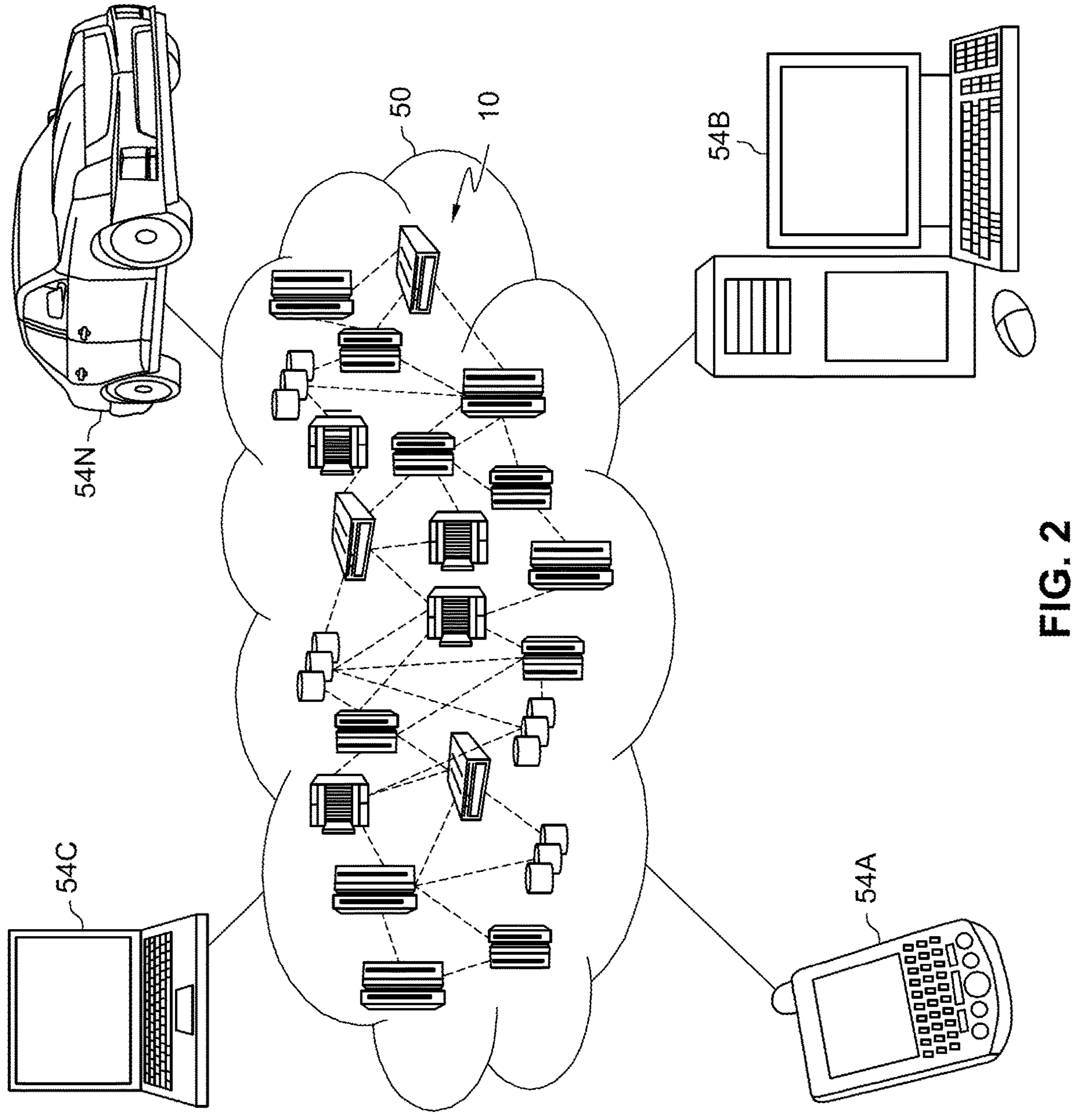
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
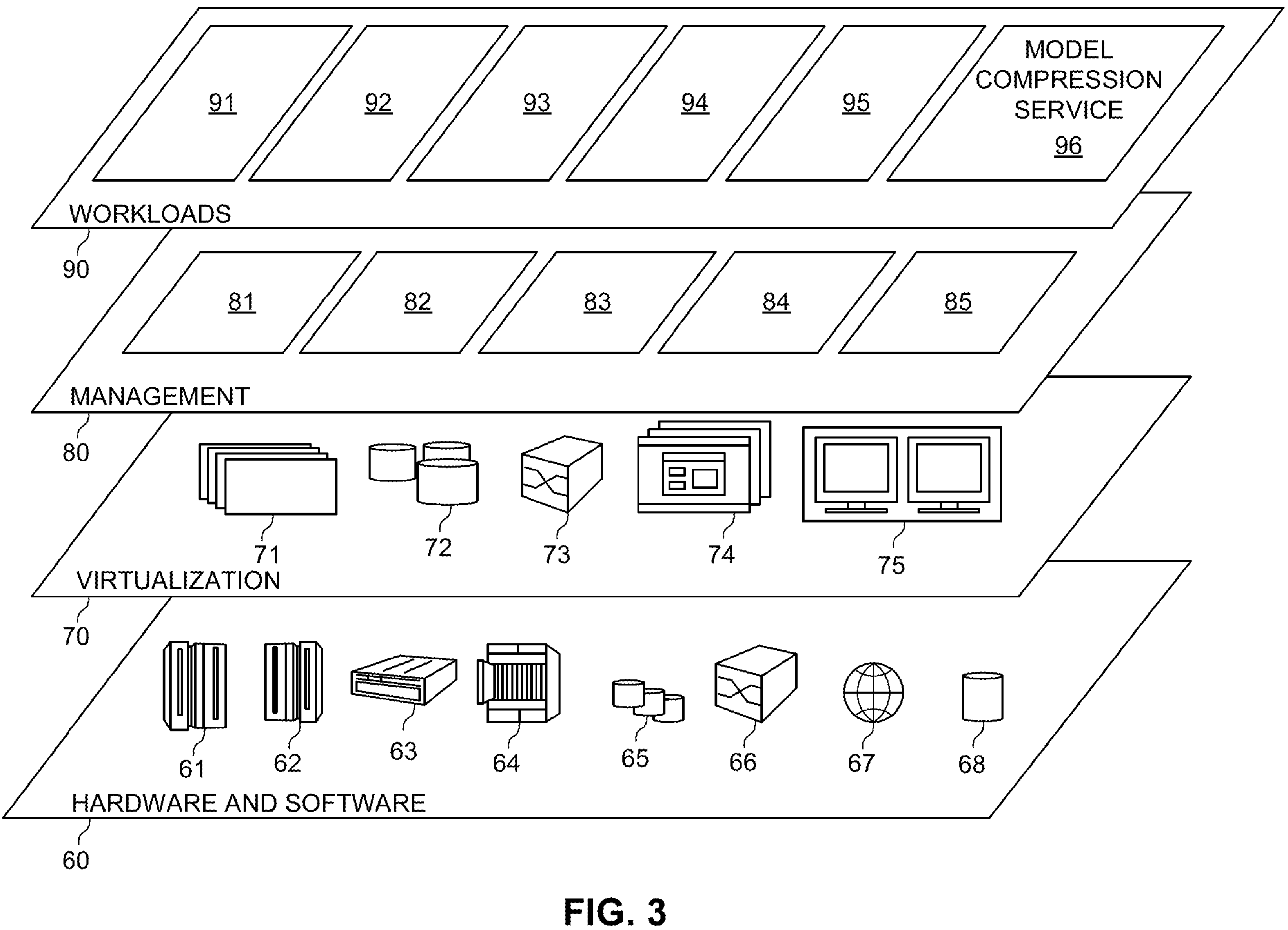
FIG. 3 depicts abstraction model layers according to an embodiment of the present invention.

Referring now to FIG. 3, a set of functional abstraction layers provided by cloud computing environment 50 (as described previously with respect to FIG. 2 above) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model compression service 96.

Figure 4:
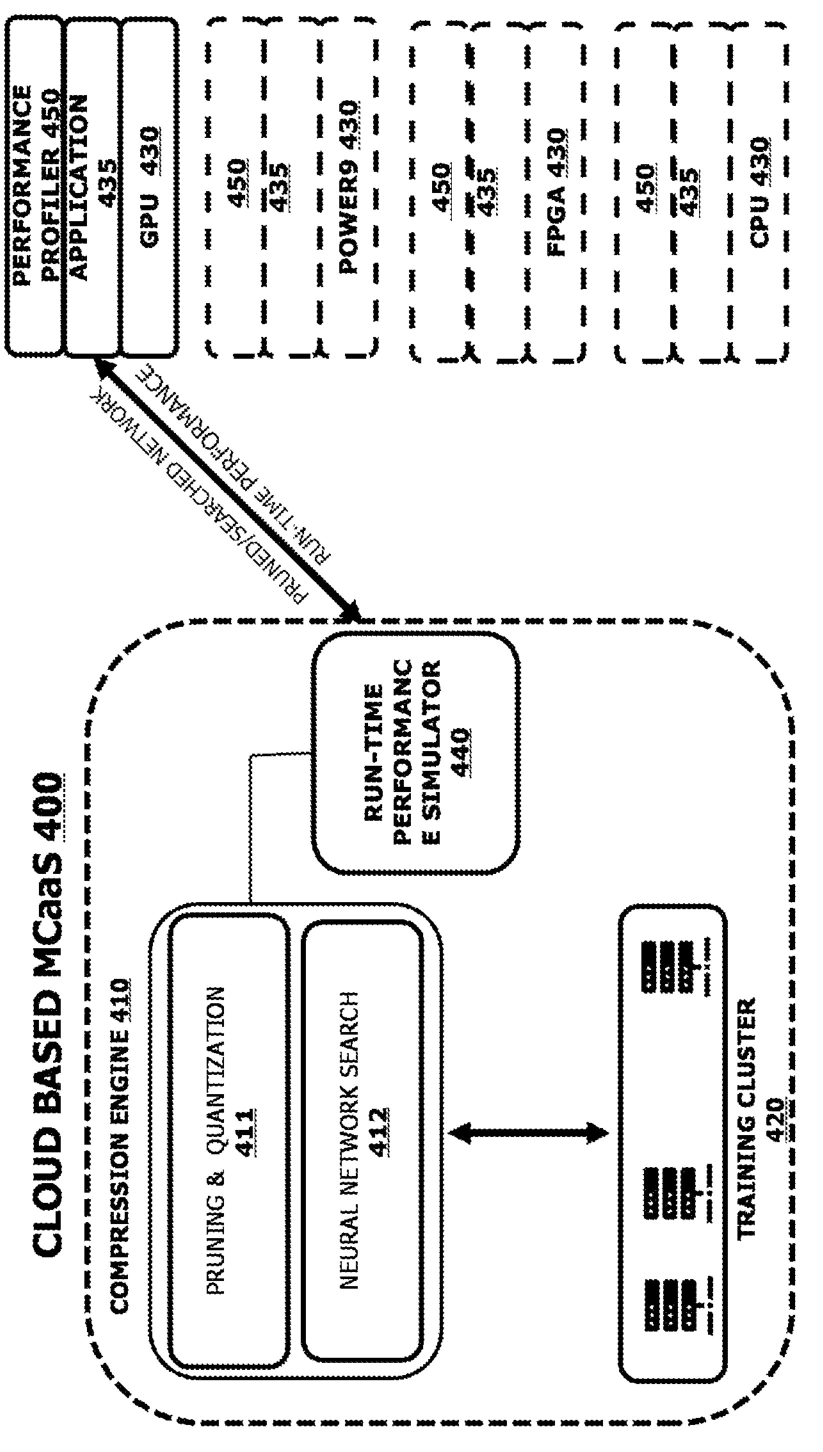
FIG. 4 illustrates an environment in which embodiments of the invention may be implemented.
Figure 5:
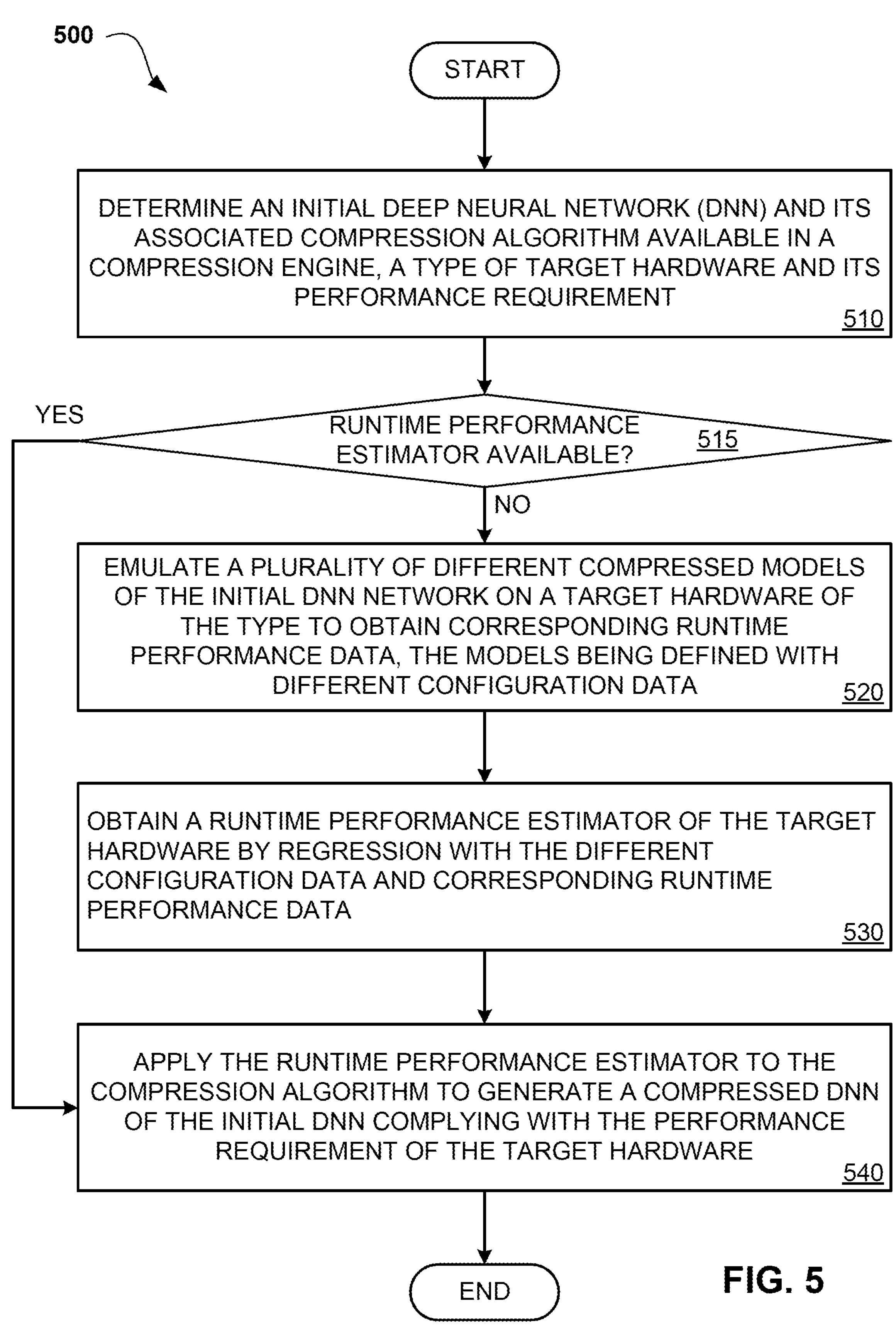
FIG. 5 is a flowchart of a general process of a method for model compression service according to an embodiment of the invention.
Figure 6:
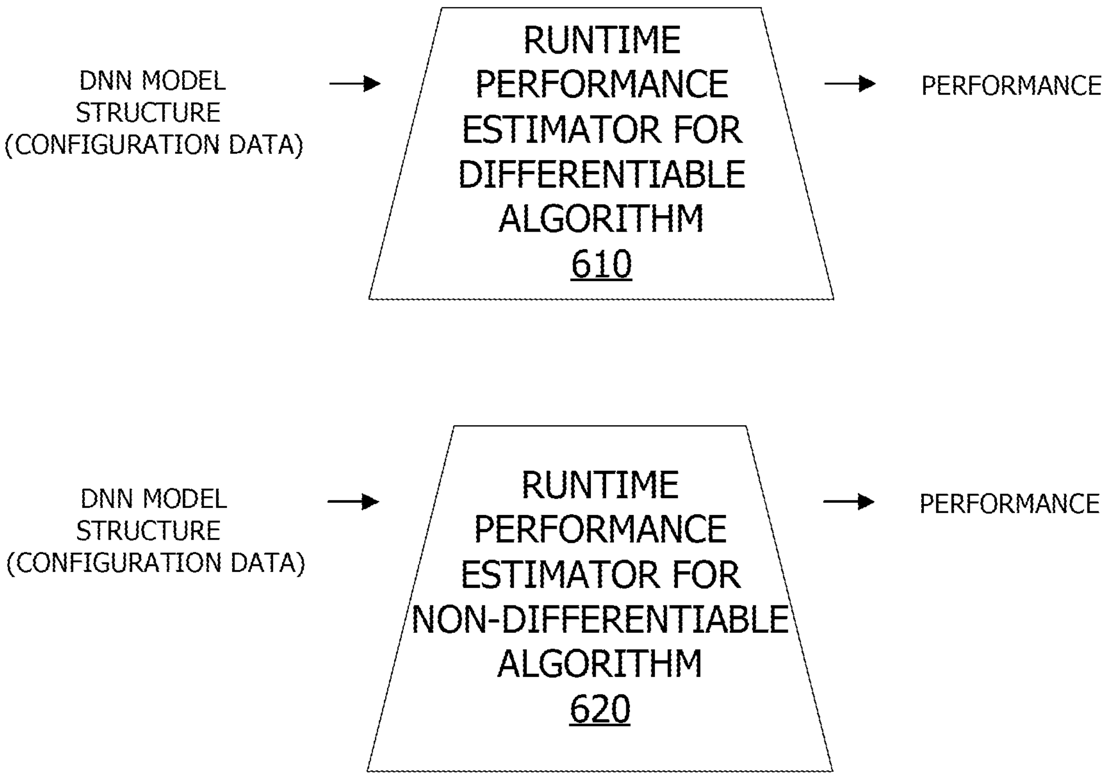
FIG. 6 illustratively shows two types of runtime performance estimator according to an embodiment of the invention.

With reference now to FIGS. 4 through 6, embodiments of the invention will be described. As discussed in the Background part above, if merely using proxy signals of the compressed model to adjust compression algorithms, the final model compression results do not embody hardware information and the compression algorithms may fail to give optimal compression strategy/network search results on target hardware. Therefore, it would be advantageous to leverage the actual hardware runtime performance to guide compression engines to execute compression algorithms for compressing DNNs.

FIG. 4 depicts an environment in which embodiments of the invention may be implemented. Specifically, FIG. 4 illustrates a cloud-based MCaaS (Model Compression as a Service) environment 400. MCaaS environment 400 comprises a compression engine 410 and a training cluster 420 in a cloud. As is known in the art, compression engine 410 may conduct compression of DNNs in three ways, namely, pruning, quantization and neural network search. In FIG. 4, compression engine 410 is shown to comprise a pruning and quantization supportive engine 411 and neural network search supportive engine 412. Engine 411 and engine 412 may be executed on training cluster 420 of computing devices to conduct pruning, quantization and neural network search to generate compressed models/networks that will run on various target hardware with different architectures, such as GPU, CPU, FPGA, Power9 and so on. It should be noted that target hardware 430 is shown in multiple possible configurations in FIG. 4. For example, a pruned DDN generated by compression engine 410 may be imported to an application 435 such as TensorRT compiler running on target hardware, e.g., GPU, 430.

As is known in the art, there are two types of compression/search algorithm. One is differentiable algorithm and the other is non-differentiable algorithm. For example, DARTS (Differentiable Architecture Search) is a differentiable algorithm for layer-wise neural network search, and eNAS (efficient Neural Architecture Search) is a non-differentiable algorithm. Compression engine 410 may support both differentiable algorithm and non-differentiable algorithm for conducting pruning, quantization and neural network search.

A user may decide to use what algorithm(s) to compress a model or search model structure that fits on specific hardware given a runtime performance requirement. Specifically, the user input may include: (1) compression/search algorithm(s) used by compression engine 410 and corresponding initial DNN network structure or search space; (2) target hardware type, such as GPU, CPU, FPGA and Power9; and (3) runtime performance requirement, for example, latency of 0.05 ms, or throughput of xx bit per second, or energy consumption of yy mJ/operation.

According to embodiments of the invention, a run-time performance simulator 440 is provided to work with compression engine 410. Run-time performance simulator 440 is configured to obtain pruned or searched DNN network models from compression engine 410 and simulate the running of the models on target hardware 430. In connection with run-time performance simulator 440, a performance profiler 450 is provided which is configured to collect runtime performance data of target hardware 430, such as latency, throughput, power consumption, etc. The operations of run-time performance simulator 440 and performance profiler 450 will be further discussed below in connection with embodiments of a method of model compression service.

Now turn to FIG. 5, which is a flowchart of process 500 of a method for model compression service according to an embodiment of the invention. Process 500 is implemented in MCaaS environment 400 (as described previously with respect to FIG. 4 above) and it may start at Step 510 as a user is requesting to implement a compressed DNN on a certain target hardware 430 (as described previously with respect to FIG. 4 above).

Step 510 involves determining an initial DNN and its associated compression algorithm available in a compression engine, a type of target hardware and its performance requirement. For example, the user raises a request to implement a compressed version of a certain DNN on a certain type of hardware, referred to as “target hardware” 430. The user may specify a DNN, the target hardware type (e.g., CPU), and the performance requirement of running the compressed version of the DNN on a target hardware of the type.

According to an embodiment of the invention, the initial DNN network determined in Step 510 may be a DNN specified in the request of the user, which may be a widely used and customized DNN such as VGG16, ResNet50, MobileNet, and so on. For example, VGG16 may be directly designated in the request to be the initial DNN. Based on the initial DNN, a compression algorithm associated with the DNN may be identified in compression engine 410.

According to an embodiment of the invention, the initial DNN may also be determined from a search space specified by the user. The search space comprises basic building blocks of a DNN, such as Conv2D, BatchNormalization, ReLu (Rectified Linear Unit) and MaxPooling. With the specified search space, the initial DNN may be searched out and thus determined.

Typically, the initial DNN is over-parameterized and thus does not meet runtime performance requirement for specific hardware. For example, automatic driving applications may require extremely low latency in time response which cannot be achieved by an over-parameterized DNN. Therefore, a compression algorithm may be used to find a more lightweight DNN network structure of the initial DNN which still keeps needed performance level. The compression algorithm may be configured in compression engine 410 and, more specifically, in engine 411 and engine 412 (as described previously with respect to FIG. 4 above).

According to an embodiment of the invention, a runtime performance estimator library (not shown) may be checked to see if there is a runtime performance estimator available for the target hardware type, as illustrated by a dotted line diamond block 515. The runtime performance estimator may have been generated previously and stored in the library for future use. If there is such a runtime performance estimator, process 500 will proceed to Step 540 which will be discussed later.

However, if there is no such runtime performance estimator, process 500 proceeds to Step 520, which involves emulating a plurality of different compressed models of the initial DNN on the target hardware to obtain corresponding runtime performance data, wherein the different compressed models are defined with different configuration data.

Then, Step 530 is performed, which involves obtaining a runtime performance estimator of a target hardware of the type by regression with the different configuration data and corresponding runtime performance data.

Then, Step 540 is performed, which involves applying the runtime performance estimator to the compression algorithm by the compression engine to generate a compressed DNN of the initial DNN complying with the performance requirement of the type of target hardware.

According to an embodiment of the invention, the runtime performance estimator obtained in Step 530 may be stored along with the initial DNN structure or search space, compression/search algorithm, target hardware type and performance requirement in a library for future use.

As discussed above with reference to block 515, if the runtime performance estimator is available at 515 for another user next time, it may be directly used by compression engine 410 in Step 540 to generate a compressed DNN without having to perform Steps 520 and 530.

Details of embodiments of the implementation of the steps above will be further described below. Now turn to FIG. 6, which illustrates two types of runtime performance estimator according to embodiments of the invention.

As is known in the art, DNN models are defined by structure configuration data of DNN and hardware runtime performance is a function of the configuration data. As known in the art, runtime performance estimator is used to characterize the relationship between a DNN model and its runtime performance in target hardware 430. Specifically, the runtime performance estimator defines a function of the structure configuration data.

As discussed in the above, there are two kinds of algorithms for compression engine 410. One kind is a differentiable algorithm and another is a non-differentiable algorithm. As is known in the art, differentiable algorithms are used for DNNs comprising stacks of connected layers such that a signal propagates from an input layer to an output layer by going through series of linear and non-linear transformations. The entire DNN expresses a single differentiable function. Non-differentiable algorithms are used for black-box search approach, such as reinforcement learning search/evolutional algorithms/grid search, where a non-differentiable reward feedback is required. Accordingly, there are two types of runtime performance estimator 610 and 620 as illustrated in FIG. 6.

The first type of runtime performance estimator 610 (also termed as "layer-wised runtime performance estimator" as is used in the art) corresponds to differentiable algorithms. The layer-wised runtime performance estimator provides a differentiable function which may be applied to differentiable compression/search algorithm, such as DARTS. As is known in the art, the layer-wised runtime performance estimator, denoted as $\text{Estimator}_{\_differentiable}$, may be expressed as: $\text{Estimator}_{\_differentiable}=\alpha*g(W,\vec{x})+\beta$, wherein g( ) is sigmoid function; $\vec{x}$ is a vector as input of g( ); α, β and W are hardware dependent parameters; the value of $\text{Estimator}_{\_differentiable}$ is a scalar value that is differentiable with respect to the vector x.

The vector $\vec{x}$ represents structure configuration data (also termed as "input layer status parameter") of a DNN. The structure configuration data comprises parameters that define a DNN model structure. According to an embodiment of the invention, the structure configuration data comprises input_shape, kernel_size, stride and channels, which are DNN structure parameters as is known in the art. So, the vector $\vec{x}$ may be expressed as $\vec{x}$=(input_shape, kernel_size, stride, channels). The output of the runtime performance estimator $\text{Estimator}_{\_differentiable}$ can be a value of hardware performance such as latency or throughput or power consumption, etc. α, β and W are layer-wised hardware dependent parameters where α and β are scalars and W is a vector that has same dimension as input vector $\vec{x}$ for every layer input. Take VGG network as example, it has 14 convolutional layers. For the first layer, the input vector $\vec{x}_1$=(input_shape=224, kernel_size=3, stride=1, channels=64), so the input vector $\vec{x}_1$ has dimension of (1, 4) row 1 column 4. Then the parameters α and β can be scalar float values of 1.0 and 0.5 as example. The parameter W will also have dimension of (1,4) row 1 column 4 like W=(0.1,0.2, 0.3,0.4). Then for the second layer, the input vector $\vec{x}_2$=(input_shape=112, kernel_size=3, stride=1, channels=128), the parameter α and β can be scalar float value of 1.5 and 0.2 as example. The parameter W can be like (0.2,0.1,0.1,0.1). It is same as this for other layers input $\vec{x}$. Then, for the whole VGG16 network, input $\vec{x}$'s dimension is (14,4), α and β's dimension is (14,1) and W's dimension is (14,4). The row value equals to the input DNN model layer number. It is to be noted that the input and output discussed above is only for the purpose of illustration without suggesting any limitations as to the scope of the invention.

As is known in the art, α, β and W in the expression above for Estimator differentiable are parameters that need to be determined so that the runtime performance estimator $\text{Estimator}_{\_differentiable}$ may be determined and applied to differentiable compression/search algorithms that require layer-wise differentiable runtime performance values.

According to an embodiment of the invention, the parameters α, β, W may be obtained by sampling a batch of DNNs running on specific hardware. This may be realized by Step 520 and Step 530 of process 500 (as will be described in more detail below).

The second type of runtime performance estimator 620 (also termed as "End2End runtime performance estimator" as is used in the art) correspond to non-differentiable compression algorithms. The End2End means the input is the whole DNN and the estimator operation is to use cascaded 1D (one-dimension) convolution operation layers by layers of the whole DNN and finally gives out the runtime values. As is known in the art, the End2End runtime performance estimator, denoted as $\text{Estimator}_{\_non\_differentiable}$, may be expressed as: $\text{Estimator}_{\_non\_differentiable}=\text{Conv1D}(W,\vec{x})+\text{bias}$, wherein Conv1D ( ) is a one-dimension convolution function; $\vec{x}$ is a vector as input of the function Conv1D ( ); bias and W are hardware dependent parameters. Specifically, the 1-D CNN estimator working method is to use Cascaded 1D conv operation layers by layers of the whole DNN and then finally gives out the runtime values.

Similar to the expression for $\text{Estimator}_{\_differentiable}$, the vector $\vec{x}$ represents the structure configuration data of a DNN. According to an embodiment of the invention, the structure configuration data comprises input_shape, kernel_size, stride and channels, and the vector x may be expressed as $\vec{x}$=(input_shape, kernel_size, stride, channels). The output of the runtime performance estimator $\text{Estimator}_{\_non\_differentiable}$ can be a value of hardware performance such as latency or throughput or power consumption, etc. Specifically, in the above expression for $\text{Estimator}_{\_non\_differentiable}$, bias is a scalar float value and W is a matrix of the whole DNN model. Take VGG16 network as example, it has 14 convolutional layers. The bias can be 0 as example. Input vector $\vec{x}$=(input_shape, kernel_size, stride, channels) for every layer, we want to use Cascaded 1D convolutional operation layers by layers of the whole DNN with step of 2, then W needs to be set to dimension (4,2) where row number equals to the input vector dimension and column number equals to the step value. For example, W=[[0.1,0.1,0.2,0.2],[0.3,0.3,0.4,0.4]] that has dimension (4,2).

Similarly, bias and W in the expression above for $\text{Estimator}_{\_non\_differentiable}$ are parameters that need to be determined so that the runtime performance estimator $\text{Estimator}_{\_non\_differentiable}$ may be determined. Once determined, it may be applied to a corresponding non-differentiable compression/search algorithm.

According to an embodiment of the invention, the parameters bias, W in the expression above for $\text{Estimator}_{\_non\_differentiable}$ may be obtained by sampling a batch of DNNs running on specific hardware. Specifically, this may be realized by Step 520 and Step 530 of process 500 (as will be described in more detail below).

According to an embodiment of the invention, obtaining a runtime performance estimator in Step 520 further comprising determining the type of the runtime performance estimator based on the type of the compression algorithm determined in Step 510. If the compression algorithm is a differentiable compression algorithm, then the runtime performance estimator is a differentiable runtime performance estimator associated with the compression algorithm. If the compression algorithm is a non-differentiable compression algorithm, then the runtime performance estimator is a non-differentiable runtime performance estimator associated with the compression algorithm.

Now taking differentiable runtime performance estimator expressed by the expression above for $\text{Estimator}_{\_differentiable}$ as example, further discussion will be provided regarding to Step 520 and Step 530.

As mentioned above, Step 520 involves emulating a plurality of different compressed models of the initial DNN on a target hardware of the type to obtain corresponding runtime performance data, wherein the different compressed models are defined with different configuration data.

Step 520 may be performed by runtime performance simulator 440 in cooperation with performance profiler 450 (as described previously with respect to FIG. 4 above). As is known in the art, the structure of a compressed model of a DNN may be defined by specific configuration data. By randomly defining different configuration data for the initial DNN, a batch of different compressed models of the initial DNN may be defined. Runtime performance simulator 440 may emulate the batch of models on target hardware 430 and obtain corresponding runtime performance data collected by performance profiler 450. The runtime performance data may comprise latency, throughput, power consumption and so on.

In the instant example, the differentiable runtime estimator is expressed as $\text{Estimator}_{\_differentiable}=\alpha*g(W,\vec{x})+\beta$. A number of n compressed models may be defined by randomly defining n set of different configuration data, each being represented by a vector x: $\vec{x}=(x_{11}, x_{12}, x_{13}, x_{14} \ldots)$, $(x_{21}, x_{22}, x_{23}, x_{24} \ldots)$, $\ldots$ $(x_{n1}, x_{n2}, x_{n3}, x_{n4} \ldots)$. Runtime performance simulator 440 emulates running of the n models on target hardware 430 (e.g., CPU) and performance profiler 450 collects corresponding performance data.

For example, different configuration data of VGG16, which is a widely used DNN, may be designated randomly to configure different models of VGG16. The different models are respectively executed on target hardware 430 and corresponding runtime performance values are collected.

Then, in Step 530, regression is carried out with the results of emulating the n models to find out values of α, β and W of $\alpha*g(W,\vec{x})+\beta$ that are fitted to target hardware 430. As a result, the runtime performance estimator for differentiable algorithm 610 (as described previously with respect to FIG. 6 above), $\text{Estimator}_{\_differentiable}$, is determined for target hardware 430.

As indicated by Step 540, the determined runtime performance estimator $\text{Estimator}_{\_differentiable}$ may be applied to the compression algorithm associated with the initial network (e.g., VGG16) by compression engine 411 (as described previously with respect to FIG. 4 above) to generate a compressed DNN (i.e., a smaller version of VGG16) complying with the performance requirement of the type of target hardware 430 (e.g., CPU). More specifically, as is known in the art, compression engine 411 will start with the initial DNN (e.g., VGG16) and iteratively update the output compressed DNN model configuration using the compression algorithm. The compression iteration will stop if the runtime performance feedback (e.g., latency value) from the runtime performance estimator, Estimator differentiable, of the output compressed DNN model, i.e., a smaller version of VGG16, can meet the runtime requirement on target hardware 430.

According to an embodiment of the invention, the determined runtime performance estimator may be stored into a library in association with the type of target hardware 430, configuration data of the initial DNN and the performance requirement. Thus, the library may contain different runtime performance estimators determined in different occasions, which may be made available for future use, as is indicated at 515 in FIG. 5.

In the above description, VGG16 is used as an example of DNNs. VGG16 is a widely used DNN. It has 16 layers, from 1st layer to 16th layer, and the kernel size (1 or 3, for example), the number of channels (64 to 512) and the stride (1, 2, . . . ). VGG16 may not work with very low latency on a CPU. However, we can decrease the number of channels and/or the kernel size to shrink the VGG16 network so that it can work on CPU with very low latency. According to embodiments of the invention, runtime performance estimator 610 of target hardware 430 (e.g., CPU) may be determined by sampling a batch of different network models (e.g., of VGG16) on the target hardware, obtaining runtime performance values of the sampled network models and performing linear regression with the values. Compression engine 410 may use the runtime performance estimator to compress an initial DNN and generate a compressed model meeting given performance requirement of target hardware.

In the above paragraphs, description is provided with regard to determining runtime performance estimator for differentiable algorithm 610 (FIG. 6). In a similar manner, hardware fitting values of bias and W in the expression above for $\text{Estimator}_{\_non\_differentiable}$ may also be found so that the runtime performance estimator for non-differentiable algorithm 620 may be determined, as shall be readily appreciated by those skilled in the art. Thus, repeated description regarding determining runtime performance estimator for differentiable algorithm 620 is not necessary and is omitted herein to avoid redundancy.

As shall be appreciated by those skilled in the art, compared to proxy signals in conventional practice, use of runtime performance metrics to adjust compression algorithms according to embodiments of the invention may optimize DNN network compression strategy/search results fulfilling hardware requirements.

It should be noted that the processing of model compression service according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of compressing a deep neural network, the method comprising:

receiving, by one or more processing units, a specification of an initial deep neural network (DNN) for compression;

receiving, by the one or more processing units, a specification of a type of target hardware for running of the initial DNN;

determining, by the one or more processing units, an associated compression algorithm available in a compression engine and a performance requirement of the type of target hardware;

emulating, by the one or more processing units, a plurality of different compressed models modeling the initial DNN on the type of target hardware to obtain corresponding runtime performance data for each of the different compressed models, wherein the different compressed models are defined with different configuration data;

obtaining, by the one or more processing units a first runtime performance estimator corresponding to a differentiable algorithm and a second runtime performance estimator corresponding to non-differentiable compression algorithms, wherein the first runtime performance estimator is a differentiable runtime performance estimator, and the second runtime performance estimator is a non-differentiable runtime performance estimator; and compressing, by the one or more processing units, the initial DNN into a compressed DNN modeling the initial DNN using the compression engine, the compressed DNN complying with the performance requirement associated with the type of target hardware, wherein the compression engine uses the first runtime performance estimator or the second runtime performance estimator in generating the compressed DNN.

2. The computer implemented method of claim 1, wherein the initial DNN is specified from a search space specifying basic building blocks of the initial DNN.

3. The computer implemented method of claim 1, wherein obtaining the runtime performance estimator further comprises determining whether the runtime performance estimator is a differentiable runtime performance estimator or a non-differentiable runtime performance estimator based on a type of the compression algorithm.

4. The computer implemented method of claim 3, wherein runtime performance defines a relationship of the configuration data to the runtime performance data.

5. The computer implemented method of claim 1, wherein the configuration data comprises DNN model structure defining parameters input_shape, kernel_size, stride and channels.

6. The computer implemented method of claim 1, wherein the runtime performance data comprises: latency or throughput or power consumption.

7. The computer implemented method of claim 1, further comprising:

storing, by the one or more processing units, the runtime performance estimator associated with the type of the target hardware, the configuration data of the initial DNN and the performance requirement in a library.

8. A computer system for compressing a deep neural network, the computer system, comprising:

a processor; and a memory containing a program that, when executed on the processor, performs an operation, the operation comprising:

receiving a specification of an initial deep neural network (DNN) for compression;

receiving a specification of a type of target hardware for running of the initial DNN;

determining an associated compression algorithm available in a compression engine and a performance requirement of the type of target hardware;

emulating a plurality of different compressed models modeling the initial DNN on the type of target hardware to obtain corresponding runtime performance data for each of the different compressed models, wherein the different compressed models are defined with different configuration data;

obtaining a first runtime performance estimator corresponding to a differentiable algorithm and a second runtime performance estimator corresponding to non-differentiable compression algorithms, wherein the first runtime performance estimator is a differentiable runtime performance estimator, and the second runtime performance estimator is a non-differentiable runtime performance estimator; and compressing the initial DNN into a compressed DNN modeling the initial DNN using the compression engine, the compressed DNN complying with the performance requirement associated with the type of target hardware, wherein the compression engine uses the first runtime performance estimator or the second runtime performance estimator in generating the compressed DNN.

9. The computer system of claim 8, wherein the initial DNN is specified from a search space specifying basic building blocks of the initial DNN.

10. The computer system of claim 8, wherein obtaining the runtime performance estimator further comprises determining whether the runtime performance estimator is a differentiable runtime performance estimator or a non-differentiable runtime performance estimator based on a type of the compression algorithm.

11. The computer system of claim 10, wherein runtime performance defines a relationship of the configuration data to the runtime performance data.

12. The computer system of claim 8, wherein the configuration data comprises DNN model structure defining parameters input_shape, kernel_size, stride and channels.

13. The computer system of claim 8, wherein the runtime performance data comprises: latency or throughput or power consumption.

14. The computer system of claim 8, the operation further comprising:

storing the runtime performance estimator associated with the type of the target hardware, the configuration data of the initial DNN and the performance requirement in a library.

15. A non-transitory computer program product comprising: a computer-readable storage medium having computer-readable program code embodied therewith, the computer-readable program code executable by one or more computer processors to perform an operation, the operation comprising:

receiving a specification of an initial deep neural network (DNN) for compression;

receiving a specification of a type of target hardware for running of the initial DNN;

determining an associated compression algorithm available in a compression engine and a performance requirement of the type of target hardware;

emulating a plurality of different compressed models modeling the initial DNN on the type of target hardware to obtain corresponding runtime performance data for each of the different compressed models, wherein the different compressed models are defined with different configuration data;

obtaining a first runtime performance estimator corresponding to a differentiable algorithm and a second runtime performance estimator corresponding to non-differentiable compression algorithms, wherein the first runtime performance estimator is a differentiable runtime performance estimator, and the second runtime performance estimator is a non-differentiable runtime performance estimator; and compressing the initial DNN into a compressed DNN modeling the initial DNN using the compression engine, the compressed DNN complying with the performance requirement associated with the type of target hardware, wherein the compression engine uses the first runtime performance estimator or the second runtime performance estimator in generating the compressed DNN.

16. The non-transitory computer program product of claim 15, wherein the initial DNN is specified from a search space specifying basic building blocks of the initial DNN.

17. The non-transitory computer program product of claim 15, wherein obtaining the runtime performance estimator further comprises determining whether the runtime performance estimator is a differentiable runtime performance estimator or a non-differentiable runtime performance estimator based on a type of the compression algorithm.

18. The non-transitory computer program product of claim 17, wherein runtime performance defines a relationship of the configuration data to the runtime performance data.

19. The non-transitory computer program product of claim 15, wherein the configuration data comprises DNN model structure defining parameters input_shape, kernel_size, stride and channels.

20. The non-transitory computer program product of claim 15, wherein the runtime performance data comprises: latency or throughput or power consumption.

* * * * *